(12) United States Patent
Kamiya

(10) Patent No.: US 10,576,973 B2
(45) Date of Patent: Mar. 3, 2020

(54) DRIVING ASSISTANCE DEVICE AND DRIVING ASSISTANCE METHOD

(71) Applicant: DENSO CORPORATION, Kariya, Aichi-pref. (JP)

(72) Inventor: Kei Kamiya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 75 days.

(21) Appl. No.: 15/839,604

(22) Filed: Dec. 12, 2017

(65) Prior Publication Data

US 2018/0162394 A1 Jun. 14, 2018

(30) Foreign Application Priority Data

Dec. 13, 2016 (JP) ................................ 2016-241222

(51) Int. Cl.
| | |
|---|---|
| *B60W 30/095* | (2012.01) |
| *G08G 1/16* | (2006.01) |
| *G06T 7/20* | (2017.01) |
| *B60W 30/09* | (2012.01) |
| *G08G 1/0962* | (2006.01) |

(52) U.S. Cl.
CPC ........ *B60W 30/0953* (2013.01); *B60W 30/09* (2013.01); *B60W 30/095* (2013.01); *G06T 7/20* (2013.01); *G08G 1/0962* (2013.01); *G08G 1/165* (2013.01); *G08G 1/166* (2013.01); *B60W 2550/308* (2013.01); *G06T 2207/30261* (2013.01)

(58) Field of Classification Search
CPC ........... B60W 30/0953; B60W 30/095; B60W 30/09; B60W 2550/308; G08G 1/165; G08G 1/0962; G08G 1/166; G06T 7/20; G06T 2207/30261
See application file for complete search history.

(56) References Cited

U.S. PATENT DOCUMENTS

| | | | |
|---|---|---|---|
| 8,861,792 B2 | 10/2014 | Stein et al. | |
| 2013/0335213 A1* | 12/2013 | Sherony | G08G 1/167 340/439 |
| 2015/0148985 A1* | 5/2015 | Jo | G08G 1/096725 701/1 |

(Continued)

*Primary Examiner* — Russell Frejd
(74) *Attorney, Agent, or Firm* — Knobbe, Martens, Olson & Bear, LLP

(57) ABSTRACT

In a driving assistance device, a distance information is acquired based on an image acquired by an imaging device mounted on a vehicle. The distance information includes a relative distance of a preceding vehicle in a travelling direction of the own vehicle, relative velocity thereof, and acceleration information thereof including relative acceleration. A time required until the own vehicle collides with the preceding vehicle is calculated with consideration of the acceleration information as a predicted collision time. It is determined whether or not the preceding vehicle is in a deceleration state by using the relative velocity. Further it is determined whether or not a collision possibility between the own vehicle and the preceding vehicle exists, and it is also determined to use the predicted collision time on the condition that the preceding vehicle is determined to be in the deceleration state and the collision possibility is determined to exist.

19 Claims, 9 Drawing Sheets

(56) References Cited

U.S. PATENT DOCUMENTS

| | | | |
|---|---|---|---|
| 2015/0266473 A1* | 9/2015 | Hayasaka | B60W 30/09 |
| | | | 701/70 |
| 2018/0017679 A1* | 1/2018 | Valouch | A63F 13/213 |
| 2018/0072310 A1* | 3/2018 | Fung | B60K 28/06 |
| 2018/0136319 A1* | 5/2018 | Send | G01C 3/32 |
| 2018/0281763 A1* | 10/2018 | Ohmori | B60W 10/04 |

* cited by examiner

DRIVING ASSISTANCE DEVICE AND DRIVING ASSISTANCE METHOD

CROSS-REFERENCE TO RELATED APPLICATION

This application claims priority to and the benefit of Japanese Patent Application No. 2016-241222 filed in the Japanese Patent Office on Dec. 13, 2016, the entire contents of which are incorporated herein by reference.

BACKGROUND

Technical Field

The present disclosure relates to a driving assistance device and a driving assistance method that are capable of operating a safety device provided in a vehicle, when a collision risk with respect to a preceding vehicle in front of an own vehicle increases.

Background Art

Driving assistance systems for an own vehicle such as a PCS (Pre-Crash Safety) system, and the like have been performed so as to reduce or prevent a collision damage between a preceding vehicle and the own vehicle. In Patent document 1, a relative distance, a relative velocity, and a relative acceleration are calculated as distance information between the preceding vehicle and the own vehicle in a manner of processing an image acquired by an imaging device. Furthermore, a predicted collision time until the own vehicle collides with the preceding vehicle is calculated by using parameters thereof. The predicted collision time is an evaluation value showing that the own vehicle will collide with an object in certain seconds in consideration of a current own vehicle travelling speed. Additionally, the relative velocity is calculated as a differential value of the relative distance. The relative acceleration is calculated as a differential value of the relative velocity, that is to say, as a second derivative value of the relative distance.

More specifically, the relative distance between the own vehicle and the preceding vehicle is divided by the relative velocity, based on which TTC (Time-To-Collision) is calculated as the predicted collision time. Furthermore, ETTC (Enhanced-Time-To-Collision) is calculated as the predicted time collision by using the relative distance, the relative velocity, and the relative acceleration. When the preceding vehicle abruptly decelerates, etc., the ETTC which considers the relative acceleration as the predicted time collision is used, thereby making it advantageously possible to control a vehicle at an earlier timing in comparison with a case where the TTC which does not consider the relative acceleration is used.

RELATED ART DOCUMENT

Patent Document

[Patent Document 1] U.S. Patent Application No. 8861792

The above information disclosed in this Background section is only to enhance the understanding of the background of the disclosure and therefore it may contain information that does not form the prior art that is already known to a person of ordinary skill in the art.

However, when using a monocular imaging device (single camera), it is difficult to accurately acquire distance information from an image acquired by the monocular imaging device. More particularly, since a relative acceleration is acquired by performing calculation processes such as time differentiating a relative velocity, etc., a possibility where noise, errors, etc. may be included therein becomes high in comparison with a relative distance and a relative velocity. Consequently, when ETTC is used for a predicted collision time, driving assistance may be performed unnecessarily, such that a driver may feel a sense of incongruity.

SUMMARY

In consideration of the drawbacks described hereinabove, the present disclosure has been made in an effort to provide a driving assistance device and a driving assistance method that are capable of suppressing an unnecessary operation of the driving assistance and capable of more appropriately performing the driving assistance of an own vehicle.

An exemplary embodiment of the present disclosure provides a driving assistance device, including: a distance information acquisition unit acquiring a relative distance of a preceding vehicle in a travelling direction of an own vehicle, a relative velocity thereof, and acceleration information thereof including a relative acceleration and any one of information corresponding to the relative acceleration, all of which are obtained from an image acquired by a monocular imaging device, as distance information; a predicted collision time calculation unit calculating a time required until the own vehicle collides with the preceding vehicle by consideration the acceleration information as a predicted collision time; a deceleration state determination unit determining whether or not the preceding vehicle is in a deceleration state by using the relative velocity; a possibility determination unit determining whether or not a collision possibility between the own vehicle and the preceding vehicle exists; and a use determination unit determining to use the predicted collision time on the condition that the preceding vehicle is determined to be in the deceleration state and the collision possibility is determined to exist.

According to embodiments of the present disclosure, the ETTC is used as the predicted collision time on the condition that the preceding vehicle is in the deceleration state and the collision possibility between the own vehicle and the preceding vehicle exists. In other words, even though the preceding vehicle is in the deceleration state, the ETTC is not used as the predicted collision time when the collision possibility between the own vehicle and the preceding vehicle does not exist. Consequently, a chance of performing driving assistance based upon the ETTC is configured to be limited, thereby having effects of suppressing the unnecessary operation of the driving assistance and of more appropriately performing the driving assistance of the own vehicle.

BRIEF DESCRIPTION OF THE DRAWINGS

In the accompanying drawings.

DETAILED DESCRIPTION OF THE EMBODIMENTS

Figure 1:
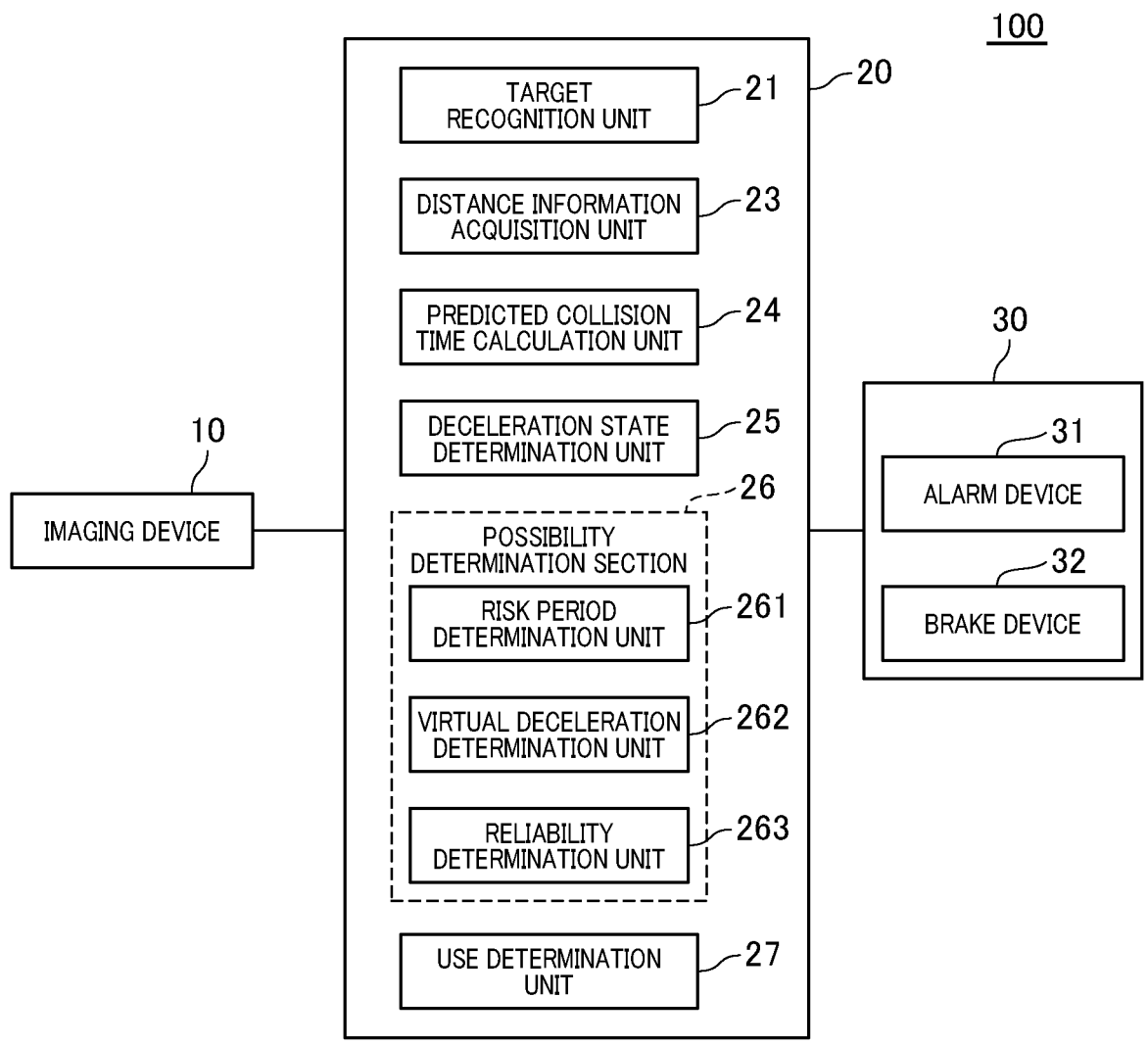
FIG. 1 is a drawing illustrating a configuration of a driving assistance device.

The present disclosure will be described more fully hereinafter with reference to the accompanying drawings, in which exemplary embodiments of the disclosure are shown. Furthermore, in respective embodiments described hereinafter, the same or equivalent meanings are denoted by the same reference numerals in the drawings, and with respect to the same reference numerals, the descriptions thereabout will be applied.

Referring to FIG. 1, a driving assistance device 100 is mounted on a vehicle VE (hereinafter, the vehicle mounted with the driving assistance device will be referred to as an own vehicle), and recognizes an object to be detected which exists around an own vehicle as a target. Furthermore, the object may include a preceding vehicle traveling in front of the own vehicle, an oncoming vehicle, moving objects such as a pedestrian existing around the own vehicle VE, etc., and stationary objects such as a guard rail, a traffic light, etc. Furthermore, the driving assistance device performs a function as a PCS (Pre-Crash Safety) system so as to avoid a collision with a recognized target or to reduce collision damage. The PCS system includes a pre-crash brake control, and the like which are automatically executed when a collision possibility is determined, etc.

The driving assistance device 100 includes an imaging device 10, an ECU 20, and a controlled object 30, all of which are configured to be connected via an in-vehicle LAN (Local Area Network) such as a CAN (Controller Area Network), and the like.

The imaging device 10 is a monocular imaging device 10 (one camera) such as a CCD camera, a CMOS image sensor, a near infrared camera, and the like. The imaging device 10 is mounted at a predetermined height at the center of a vehicle in a vehicle width direction, and captures a region extending in a predetermined angular range toward a front of the vehicle at every predetermined control period. Afterwards, an acquired image is transmitted to the ECU 20.

The ECU 20, which is a vehicle control device, is provided as a computer system including a CPU as a main body, and also includes a ROM, a RAM, an input/output interface, and other necessary components. Various functions of the ECU 20, which will be described hereinafter, are accomplished in a manner that the CPU executes a program stored in the ROM. Furthermore, the history of various data acquired by the ECU 20 is stored in the RAM.

The ECU 20 includes a target recognition unit 21 recognizing an object to be detected which exists around the own vehicle as a target; a distance information acquisition unit 23 acquiring distance information of the target; a predicted collision time calculation unit 24 calculating a predicted collision time between the target and the own vehicle based upon a plurality of patterns; a deceleration state determination unit 25 determining whether or not the preceding vehicle is in a deceleration state; a possibility determination section 26 determining whether or not a collision possibility between the own vehicle and the preceding vehicle exists; and a use determination unit 27 selecting the predicted collision time to be used from among the predicted collision times of the plurality of patterns which are calculated by the predicted collision time calculation unit 24. Respective functions thereof will be hereinafter described in detail.

A controlled object 30 is a safety device driven by a control command from the ECU 20, and includes an alarm device 31 and a brake device 32.

The alarm device 31 is a speaker or a display installed in a vehicle compartment of the own vehicle. When the ECU 20 determines a high collision possibility with an obstacle, the alarm device 31 informs a driver of a collision risk by outputting an alarm sound, an alarm message, and the like according to the control command from the ECU 20.

The brake device 32 is a braking device that brakes the own vehicle. When the ECU 20 determines that there is a high risk of collision with the obstacle, the brake device 32 is operated according to the control command from the ECU 20. More specifically, a braking force with respect to a brake operation by the driver is configured to be stronger (brake assist function), and an automatic brake is operated when the brake operation is not performed by the driver (automatic brake function).

Next, respective functions of the ECU 20 will be hereinafter described in detail.

The target recognition unit 21 recognizes the object to be detected which is included in the image acquired by the imaging device 10 as the target. For example, an object which is extracted by performing a pattern matching method using an identification dictionary with respect to the image is recognized as the target. With respect to the identification dictionary, a vehicle dictionary for identifying vehicles such as a preceding vehicle and an oncoming vehicle, a pedestrian dictionary for identifying a pedestrian, a stationary object dictionary for identifying a stationary object on a road (guard rail, etc.), etc. are provided.

Figure 2:
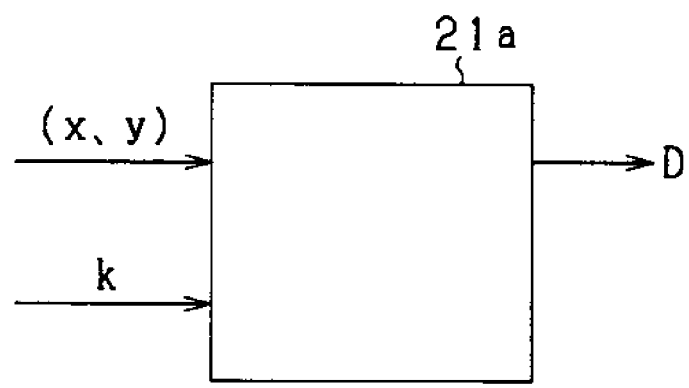
FIG. 2 is a drawing illustrating a method of calculating a relative distance and a relative velocity.

The distance information acquiring unit 23 acquires a relative distance D between the own vehicle and respective targets, a relative velocity V therebetween, and a relative acceleration $\alpha$ therebetween as distance information. In an exemplary embodiment of the present disclosure, as shown in FIG. 2, the relative distance D is obtained by substituting coordinates (x, y) of the target in a current image and an image magnification ratio K into a well-known calculation model. For example, a Kalman filter is used as a calculation model. Then, the relative velocity V is obtained by time differentiating the relative distance D. Furthermore, the relative acceleration $\alpha$ is obtained by time differentiating the relative velocity V. That is, the relative acceleration $\alpha$ may be obtained by time differentiating the relative distance D twice.

Here, the image magnification ratio K is a ratio of a target size (image region) on a current image to a target size (image region) on a past image. In the exemplary embodiment, the image magnification ratio K is calculated by using a plurality of different calculation methods. For example, as a first method, a first image magnification ratio K1 is obtained as the image magnification ratio K by using an LK method (Lucas-Kanade method) which is a combination of a well-known least squares method and a hill climbing method. As a second method, a second image magnification ratio K2 is obtained as the image magnification ratio K, based upon a change of a target size (image region) with respect to a time-varying image of the imaging device 10, that is to say an image of two different frames.

In the exemplary embodiment, an image reliability level is evaluated, based upon whether or not the first image magnification ratio K1 and the second image magnification ratio K2 match each other. Evaluation of the image reliability level will be hereinafter described in detail.

The predicted collision time calculation unit 24 calculates the predicted collision of a plurality of patterns. The predicted collision time is an evaluation value showing that the own vehicle will collide with an object in certain minutes when travelling at a current own vehicle speed. The lower the predicted collision time is, the higher a collision risk becomes, that is to say, the greater the predicted collision time is, the lower the collision risk becomes. In the exemplary embodiment, TTC (Time-To-Collision) and ETTC (Enhanced TTC) are calculated as the predicted collision time.

The TTC is a value obtained in a manner of dividing the relative distance D in a traveling direction of the own vehicle and the target by the relative velocity V between the own vehicle and the target, and for example, as shown in an equation 1, the TTC is calculated by using a motion equation of uniform linear motion.

$$TTC = D/V \quad (1)$$

The ETTC is a value obtained in consideration of the relative acceleration $\alpha$ between the own vehicle and the target, and, for example, as shown in an equation 2, is calculated by using a motion equation of uniform acceleration linear motion.

$$EETC = [\{-V + (V^2 + 2\alpha \cdot D)\}^{1/2}]/\alpha \quad (2)$$

When the target is the preceding vehicle and the preceding vehicle in a deceleration state, the preceding vehicle approaches the own vehicle rapidly. In this case, the driving assistance can be performed at an earlier timing as the predicted collision time by using the ETTC considering the relative acceleration $\alpha$ with respect to the preceding vehicle.

However, when using the monocular imaging device 10, it is difficult to accurately acquire the distance information of the target from the image acquired thereby. More particularly, the relative acceleration $\alpha$ obtained by time differentiating the relative distance twice has a high possibility of including noise, errors, and the like in comparison with the relative distance D and the relative velocity V. Therefore, when using the ETTC as the predicted collision time, an alarm, automatic braking, and the like are operated at an unnecessary timing, such that the driver may feel a sense of incongruity.

Meanwhile, even though the preceding vehicle is in the deceleration state, when the collision possibility between the own vehicle and the preceding vehicle does not exist, the driving assistance at an earlier timing by the ETTC is considered to be unnecessary. Thus, even in a case where the preceding vehicle is in the deceleration state, when the collision possibility between the own vehicle and the preceding vehicle does not exist, the ECU 20 according to the exemplary embodiment does not perform the driving assistance based upon the ETTC. In other words, when the preceding vehicle is in the deceleration state and the collision possibility between the own vehicle and the preceding vehicle exists, the ECU 20 uses the ETTC as the predicted collision time.

Hereinafter, the respective functions of the ECU 20 will be described again.

The deceleration state determination unit 25 determines whether or not the preceding vehicle is in the deceleration state. The deceleration state of the preceding vehicle is obtained from the relative acceleration $\alpha$, however, as described hereinabove, information corresponding to the relative acceleration $\alpha$ is easy to be influenced by the noise, the error, and the like. Therefore, the deceleration state determination unit 25 determines the deceleration state of the preceding vehicle by using the relative velocity V. Furthermore, in this case, a value that is obtained by subtracting a speed of the preceding vehicle from a speed of the own vehicle is defined as the relative velocity V.

Figure 3:
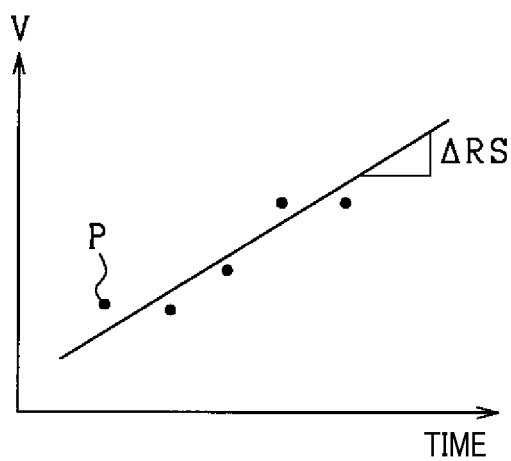
FIG. 3 is a drawing illustrating one example of a variation of a relative velocity.

That is, as shown in an example of FIG. 3, a past value P of the relative velocity V with respect to the preceding vehicle is sampled at plural points, and a variation $\Delta RS$ of the relative velocity V is calculated, based on which it is determined whether or not the preceding vehicle has a tendency to decelerate by using the variation $\Delta RS$. For example, the variation $\Delta RS$ is calculated as a speed variation per unit time of a change line by using the speed change line calculated based upon the least squares method, and the like. Additionally, the variation $\Delta RS$ is an index for grasping a general tendency of the deceleration of the preceding vehicle and may be calculated when at least two past values P of the relative velocity V are provided.

Figure 4:
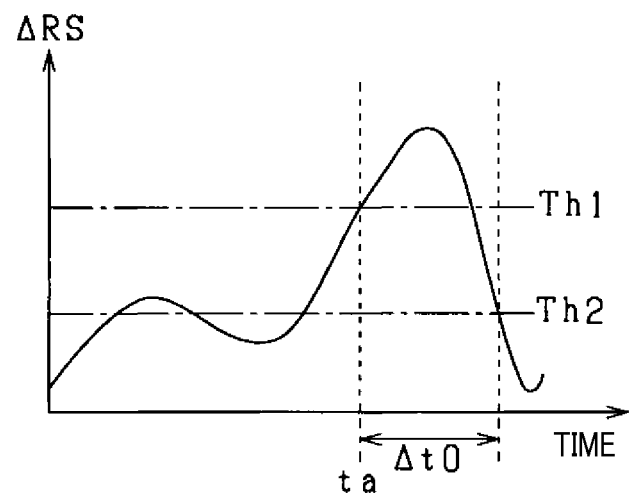
FIG. 4 is a drawing illustrating deceleration state determination based upon a variation of a relative velocity.

Next, as shown in FIG. 4, when the variation $\Delta RS$ exceeds a predetermined threshold value Th1 at a time ta, it is determined that the preceding vehicle is in a deceleration state. Furthermore, the threshold value Th1 may be set, for example, by previously acquiring a deceleration level of the preceding vehicle in which the driver feels danger.

Meanwhile, when the variation $\Delta RS$ becomes lower than a threshold value Th2 (Th2<Th1) after the variation $\Delta RS$ becomes greater than the threshold value Th1, that is to say, a period $\Delta t0$ elapses in FIG. 3, a determination result that the preceding vehicle is in the deceleration state is canceled. Furthermore, the threshold value Th2 may be set to a value having a predetermined hysteresis width with respect to the threshold value Th1, and the like.

Returning to the description of FIG. 1, the possibility determination section 26 is provided with respective functions of a risk period determination unit 261, a virtual deceleration determination unit 262, and a reliability determination unit 263, thereby having an effect of determining whether or not the collision possibility between the own vehicle and the preceding vehicle exists, based upon determination results of respective determination units.

More specifically, the risk period determination unit 261 determines whether or not there is a possibility that the driver drives the vehicle distractedly, that is to say, determines whether or not the driver is in a distracted driving state. Here, the distracted driving state means a state where there is a possibility that the driver of the own vehicle may have a difficulty in responding to a movement of the preceding vehicle, that is to say, for example, the distracted driving state means a state where there is a possibility that the driver does not concentrate on driving because the drive does not keep his/her eyes to the front, and the like. The distracted driving state may occur, when a state in which the relative velocity V between the own vehicle and the preceding vehicle does not change (a state in which a vehicle-to-vehicle distance has not changed) keeps continuing for more than a certain period of time. Then, when the driver is in the distracted driving state, there is a high possibility that a response of the driver is delayed immediately after the preceding vehicle starts to decelerate, which may result in a high collision risk.

Here, the risk period determination unit 261 first determines that the driver is in the distracted driving state when the state in which the relative velocity between the own vehicle and the preceding vehicle does not change keeps continuing for a predetermined period (for example, from several seconds to several minutes). Specifically, when the driver is determined to be in the distracted driving state, a predetermined deceleration start period (several seconds) immediately after the preceding vehicle starts to decelerate and thus consequently the relative velocity V starts to increase is determined to be a risk period during which the collision risk between the own vehicle and the preceding vehicle increases.

Figure 5:
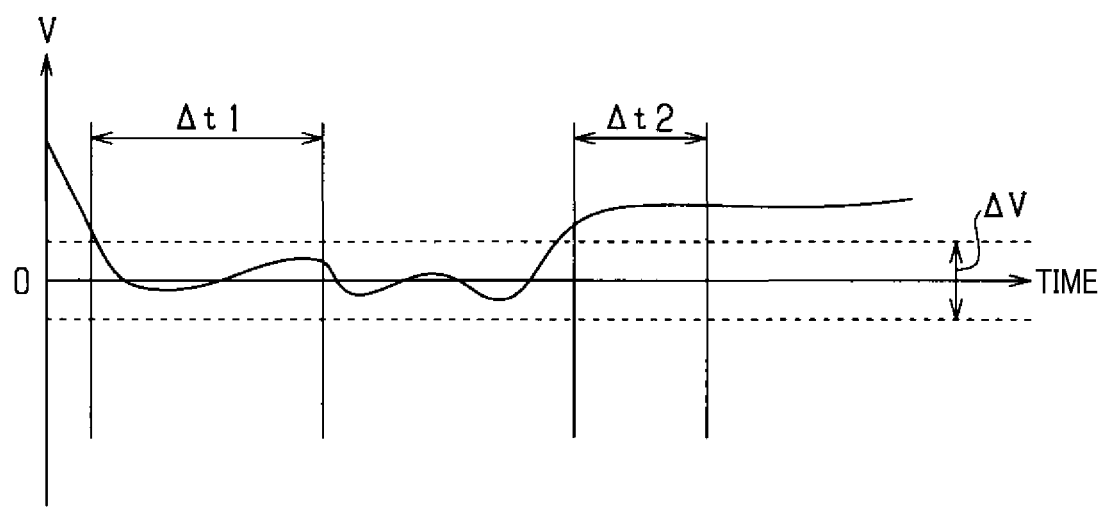
FIG. 5 is a drawing illustrating determination of a risk period.

Referring to FIG. 5, when an absolute value of the relative velocity V between the own vehicle and the preceding vehicle keeps continuing for a determination period $\Delta t1$ in a state of being lower than a predetermined value (a vicinity of zero, for example, a speed difference between the own vehicle and the preceding vehicle is lower than 1 to 5 km/h), it is determined that the driver is in the distracted state. Furthermore, after it is determined that the driver is in the distracted driving state, the predetermined deceleration start period immediately after the preceding vehicle starts to decelerate and thus consequently the relative velocity V starts to increase is determined as a risk period $\Delta t2$.

When it is determined that the preceding vehicle has decelerated at a predetermined deceleration (a virtual deceleration), the virtual deceleration determining unit 262 determines whether or not there is a possibility that the own vehicle and the preceding vehicle may collide with each other. More specifically, under an assumption that the preceding vehicle has decelerated at the predetermined virtual deceleration VD, a time required until the own vehicle collides with the preceding vehicle is calculated as a virtual time ETTC2 based upon the virtual deceleration VD, the relative distance D, and the relative velocity V. Furthermore, the virtual deceleration VD is set by obtaining a deceleration value of the preceding vehicle in which the driver of the own vehicle feels the collision risk.

$$0.5 \cdot VD \cdot EETC2^2 + V \cdot EETC2 = D \quad (3)$$

Next, when the virtual time ETTC2 calculated based upon an equation 3 is lower than a lower limit value Th3 of an allowed time in which a collision avoidance operation is possible, the virtual deceleration determination unit 262 determines that the collision possibility between the own vehicle and the preceding vehicle exists. Additionally, the lower limit value Th3 of the allowed time may be set in advance based upon an experiment, and the like.

The reliability determination unit 263 determines whether or not the image acquired by the imaging device 10 is reliable. In the exemplary embodiment, when a difference $\Delta k$ between the first image magnification ratio K1 and the second image magnification ratio K2 is lower than a predetermined value, it is determined that the image has the reliability. When the difference $\Delta k$ between the first image magnification ratio K1 and the second image magnification ratio K2 is greater than the predetermined value, it is determined that the image is not reliable. When it is determined that the image has the reliability, the image is used for calculating distance information. Meanwhile, when it is determined that the image does not have the reliability, the image is not used for calculating the distance information.

The use determination unit 27 selects any one of the TTC and the ETTC as the predicted collision time based upon a determination result of the deceleration state determination unit 25 and the possibility determination section 26. That is, when the deceleration state determination unit 25 determines that the preceding vehicle is in the deceleration state and when the possibility determination section 26 determines that the collision possibility between the own vehicle and the preceding vehicle exists, the use determination unit 27 determines that the ETTC is used for the predicted collision time. On the other hand, when the preceding vehicle is not in the deceleration state or when the possibility determination section 26 determines that the collision possibility between the own vehicle and the preceding vehicle does not exist, the use determination unit 27 determines that the TTC is used for the predicted collision time. That is, it is determined that the ETTC is not used as the predicted collision time.

Figure 7:
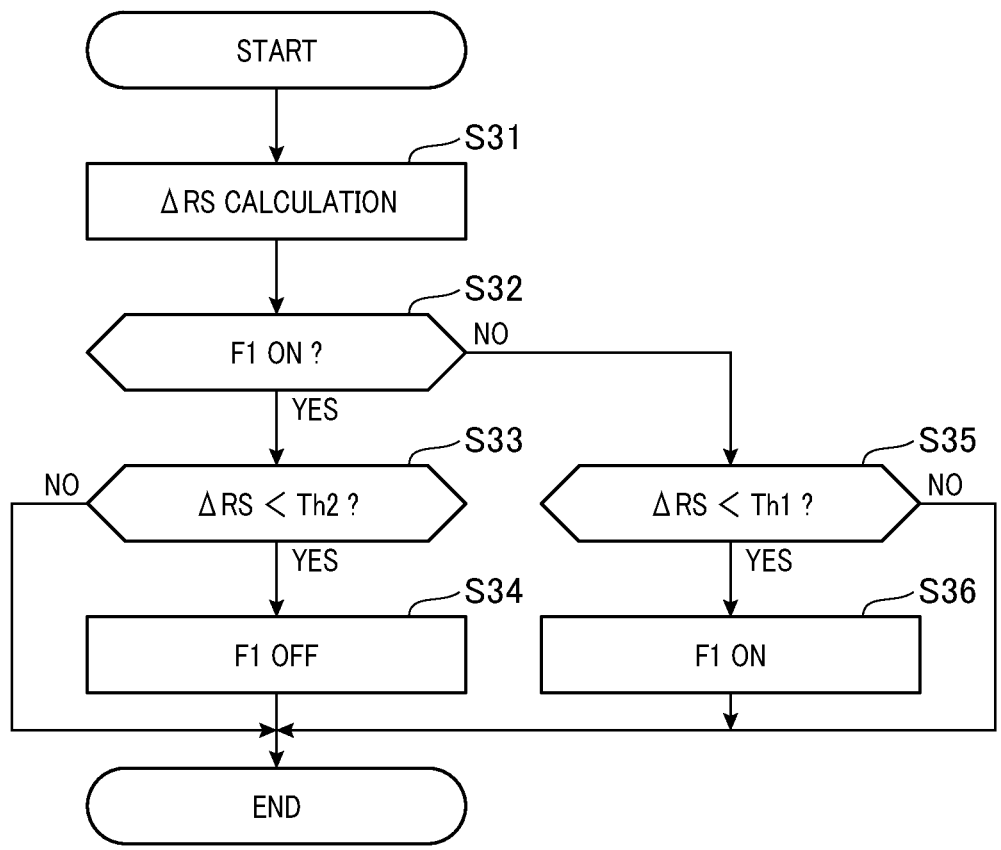
FIG. 7 is a flowchart illustrating a series of processes performed by a driving assistance device.
Figure 8:
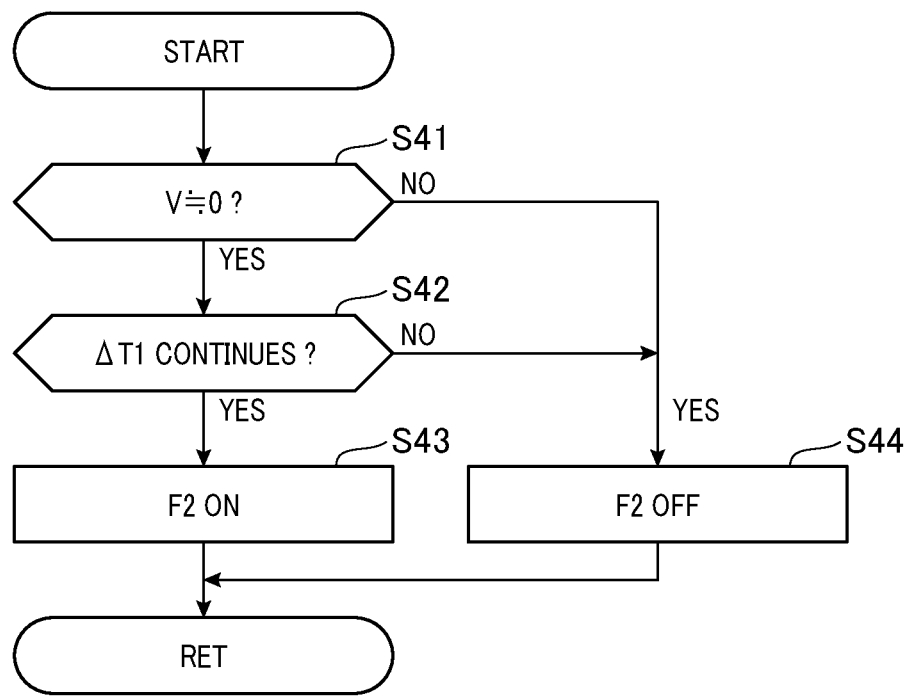
FIG. 8 is a flowchart illustrating a series of processes performed by a driving assistance device.

Next, the exemplary embodiments of the processes mentioned hereinabove will be described with reference to flowcharts of FIGS. 6 to 8. In addition, the following processes will be repeatedly executed by the ECU 20 at a predetermined cycle.

Figure 6:
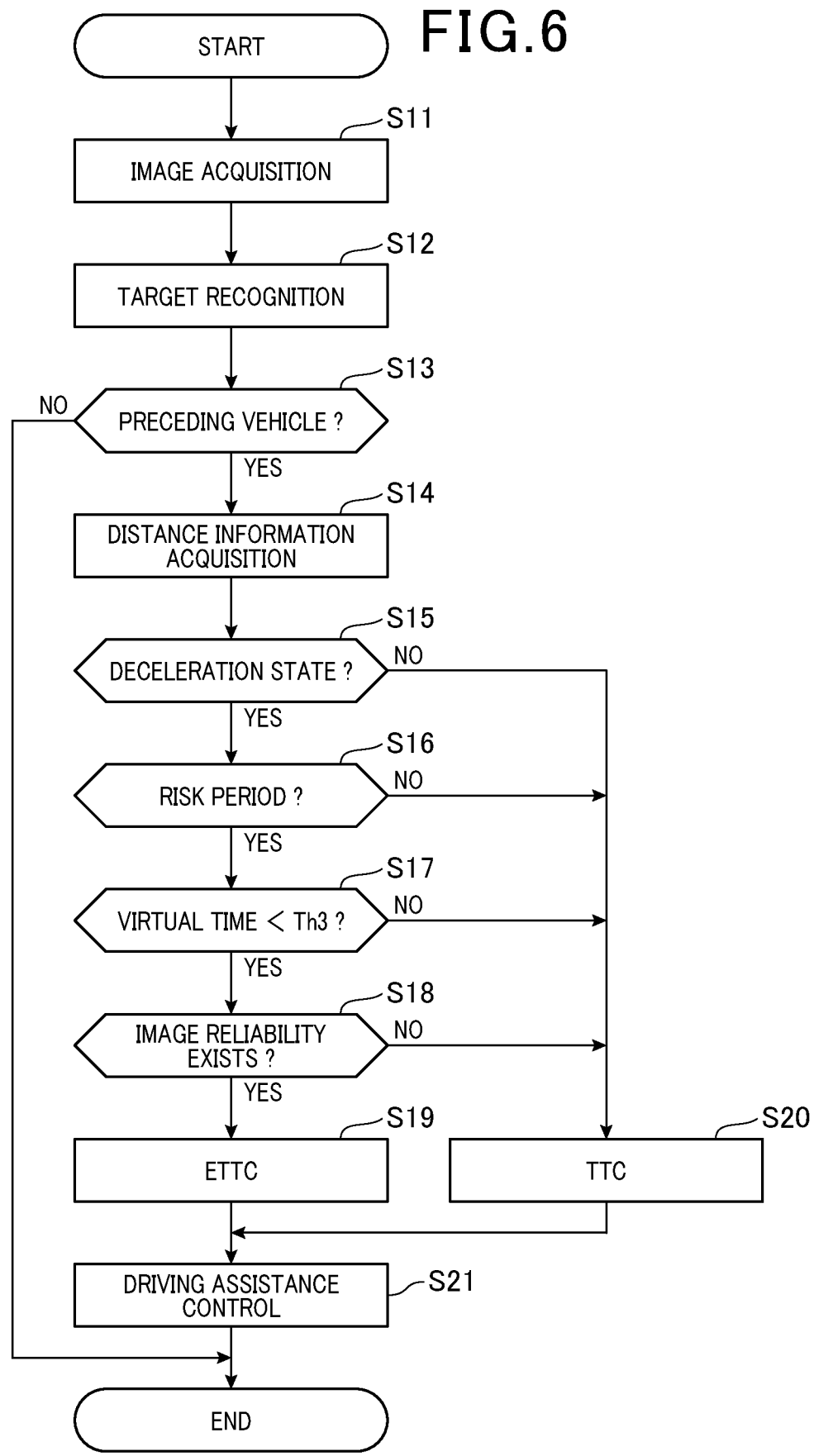
FIG. 6 is a flowchart illustrating a series of processes performed by a driving assistance device.

Referring to FIG. 6, an image in front of the own vehicle is acquired by the monocular imaging device 10 at step S11, and an object to be detected which is included in the image acquired at step S11 is recognized as a target at step S12. Next, it is determined whether or not the preceding vehicle exists at step S13 from among the targets recognized at step S12. When it is determined that the preceding vehicle exists at step S13 (YES), the relative distance D between the own vehicle and the preceding vehicle, the relative velocity V therebetween, and the relative acceleration $\alpha$ therebetween are acquired as the distance information at step S14. Furthermore, the pieces of distance information obtained therefrom are stored in the RAM as history.

Next, it is determined whether or not the preceding vehicle is in the deceleration state at step S15. Next, it is determined whether or not there is the risk period in which the collision possibility between the own vehicle and the preceding vehicle exists at step S16. Furthermore, respective processes of steps S15 and S16 will be hereinafter described in detail. Next, when the preceding vehicle decelerates at the virtual deceleration, it is determined whether or not the collision possibility between the own vehicle and the preceding vehicle exists at step S17. In this process, on the condition that the virtual time ETTC2 calculated by the equation 3 becomes lower than the lower limit value Th3 of the allowed time, it is determined that the collision possibility therebetween exists. The collision possibility shown at steps S16 and S17 is a collision risk which potentially occurs, depending on the driver or performance of the vehicle body, and is used as an indicator different from the collision prediction based on the predicted collision time (TTC, ETTC).

Next, it is determined whether or not the image acquired by the imaging device 10 is reliable at step S18. Here, when the difference $\Delta k$ between the first image magnification ratio K1 and the second image magnification ratio K2 is lower than the predetermined value, it is determined that the image is reliable.

When respective processes at steps S15 to S18 make an affirmative determination, it is determined that the ETTC is used as the predicted collision time at step S19. When any one of the processes at step S15 to S18 is denied, it is determined that the TTC is used as the predicted collision time at step S20. That is, when any one of the processes at step S15 to S18 is denied, the ETTC becomes not used as the predicted collision time.

Next, the predicted collision time (ETTC or TTC) to be used as the driving assistance and an operation timing of the controlled object 30 are compared with each other at step S21. In this case, when the predicted collision time is equal to or lower than the operation timing, any one of respective functions with respect to the controlled object 30 is executed. On the other hand, when the predicted collision time is greater than the operation timing, the controlled object 30 is not operated and the process is terminated. Furthermore, when it is determined that there is no preceding vehicle in the image, the process is terminated.

Next, referring to FIG. 7, a determination process with respect to the deceleration state of the preceding vehicle at step S15 is described hereinafter in detail. First, a variation ΔRS of the relative velocity V acquired as the distance information at step S14 in FIG. 6 is obtained at step S31 (refer to FIG. 3). Next, it is determined whether or not a deceleration determination flag F1 is turned ON at step S32. The deceleration determination flag F1 is turned ON when the variation ΔRS is determined to be greater than the threshold value Th1 at step S35 which will be described later. When it is determined that the deceleration determination flag F1 is turned ON at step S32 (YES), it is determined whether or not the variation ΔRS is lower than the threshold value Th2 at step S33. When the variation ΔRS is lower than the threshold value Th2 at step S33 (YES), the deceleration determination flag F1 is turned OFF at step S34. When the variation ΔRS is greater than the threshold value Th2 at step S33 (NO), the process is terminated. In this case, the deceleration determination flag F1 continues in an ON-state.

Meanwhile, when the deceleration determination flag F1 is turned OFF at step S32 (NO), it is determined whether or not the variation ΔRS is greater than the threshold value Th1 at step S35. When the variation ΔRS is greater than the threshold value Th1 at step S35 (YES), the deceleration determination flag F1 is turned ON at step S36. When the variation ΔRS is lower than the threshold value Th1 at step S35 (NO), the process is terminated. In this case, the decelerating determination flag F1 continues in an OFF-state.

In the case of the determination process at step S15 in FIG. 6, when the deceleration determination flag F1 is turned ON, the preceding vehicle is determined to be in the deceleration state at step S15 (YES). On the other hand, when the deceleration determination flag F1 is turned OFF, it is determined that the preceding vehicle is not in the deceleration state at step S15 (NO).

Next, referring to FIGS. 8 and 9, a determination process of the risk period at step S16 will be hereinafter described in detail. In FIG. 8, based upon history of the relative velocity V acquired at step S14 in FIG. 6, it is determined whether or not the relative velocity V is in a vicinity of zero at step S41. When the relative velocity V is in the vicinity of zero at step S41 (YES), it is determined whether or not a state where the relative velocity V is in the vicinity of zero keeps continuing longer than the determination period Δt1 at step S42. When the state where the relative velocity V is in the vicinity of zero keeps continuing longer than the determination period Δt1 at step S42 (YES), the distracted driving state is determined and thus consequently the distracted driving state flag F2 is turned ON at step S43. On the other hand, when the relative velocity V is not in the vicinity of zero at step S41 (NO) or when the state where the relative velocity V is in the vicinity of zero is shorter than the determination period Δt1 at step S42 (NO), the distracted driving state is not determined and thus consequently the distracted driving state flag F2 is turned OFF at step S44.

Figure 9:
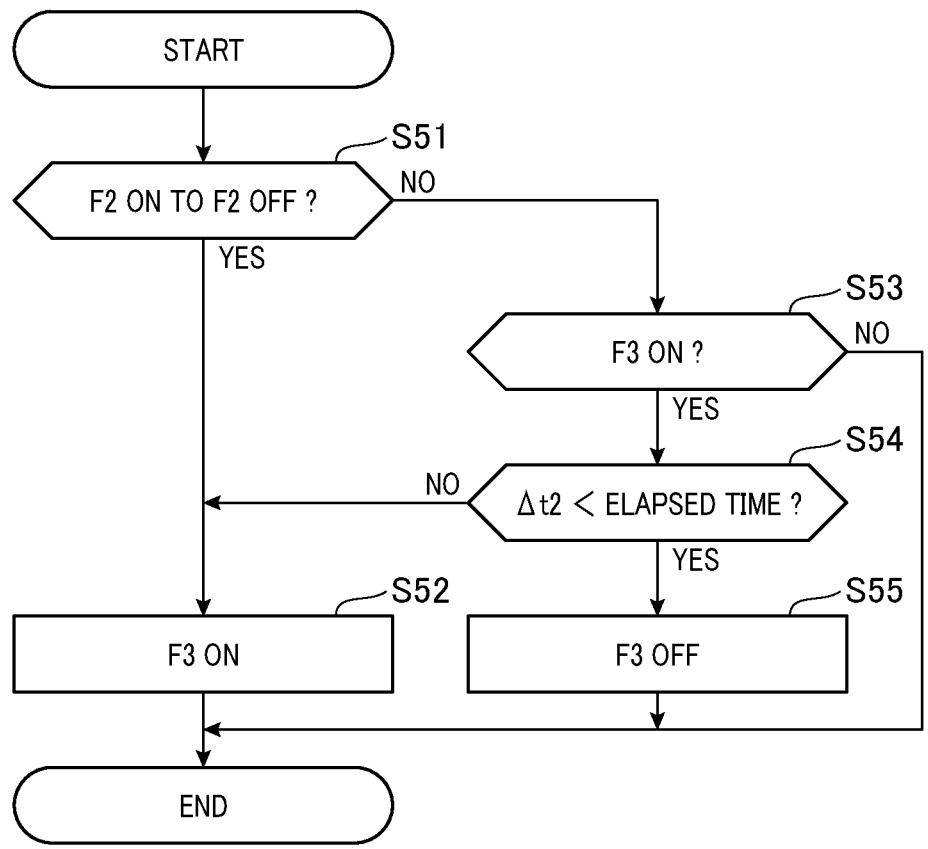
FIG. 9 is a drawing illustrating a series of processes performed by a driving assistance device according to an exemplary embodiment.

Next, referring to FIG. 9, it is determined whether or not the distracted driving state flag F2 is in a process of being switched from ON to OFF at step S51. This process makes an affirmative determination at a timing when the relative velocity V increases due to the deceleration of the preceding vehicle. When the distracted driving state flag F2 is in the process of being switched from ON to OFF at step S51 (YES), a risk period flag F3 is turned ON at step S52. On the other hand, when the distracted driving state flag F2 is not in the process of being switched from ON to OFF at step S51 (NO), it is determined whether or not the risk period flag F3 is turned ON at step S53. When the preceding vehicle does not start to decelerate, etc., and when the risk period flag F3 is turned OFF at step S53 (NO), the process is terminated. In this case, the risk period flag F3 continues in the OFF-state.

Meanwhile, when the preceding vehicle starts to decelerate and the risk period flag F3 is turned ON at step S53 (YES), it is determined whether or not an elapsed time from a deceleration start is longer than a predetermined risk period Δt2 at step S54. When the elapsed time from the deceleration start is shorter than the risk period Δt2 at step S54 (NO), the risk period flag F3 continues in the ON-state at step S52. On the other hand, when the elapsed time from the deceleration start is longer than the risk period Δt2 at step S54 (YES), the risk period flag F3 is turned OFF at step S55.

In the determination process at step S16 in FIG. 6, when the risk period flag F3 is turned ON, the risk period is determined at step S16 (YES). In contrast, when the risk period flag F3 is turned OFF, the risk period is not determined at step S16 (NO).

Next, execution examples of the processes mentioned hereinabove are described in FIG. 10. Furthermore, when it is assumed that the preceding vehicle decelerates based upon a virtual deceleration, it is determined that the collision possibility between the own vehicle and the preceding vehicle exists. Additionally, the distance information is acquired by using an image in which the difference Δk between the first image magnification ratio K1 and the second image magnification ratio K2 is lower than the predetermined value.

Figure 10:
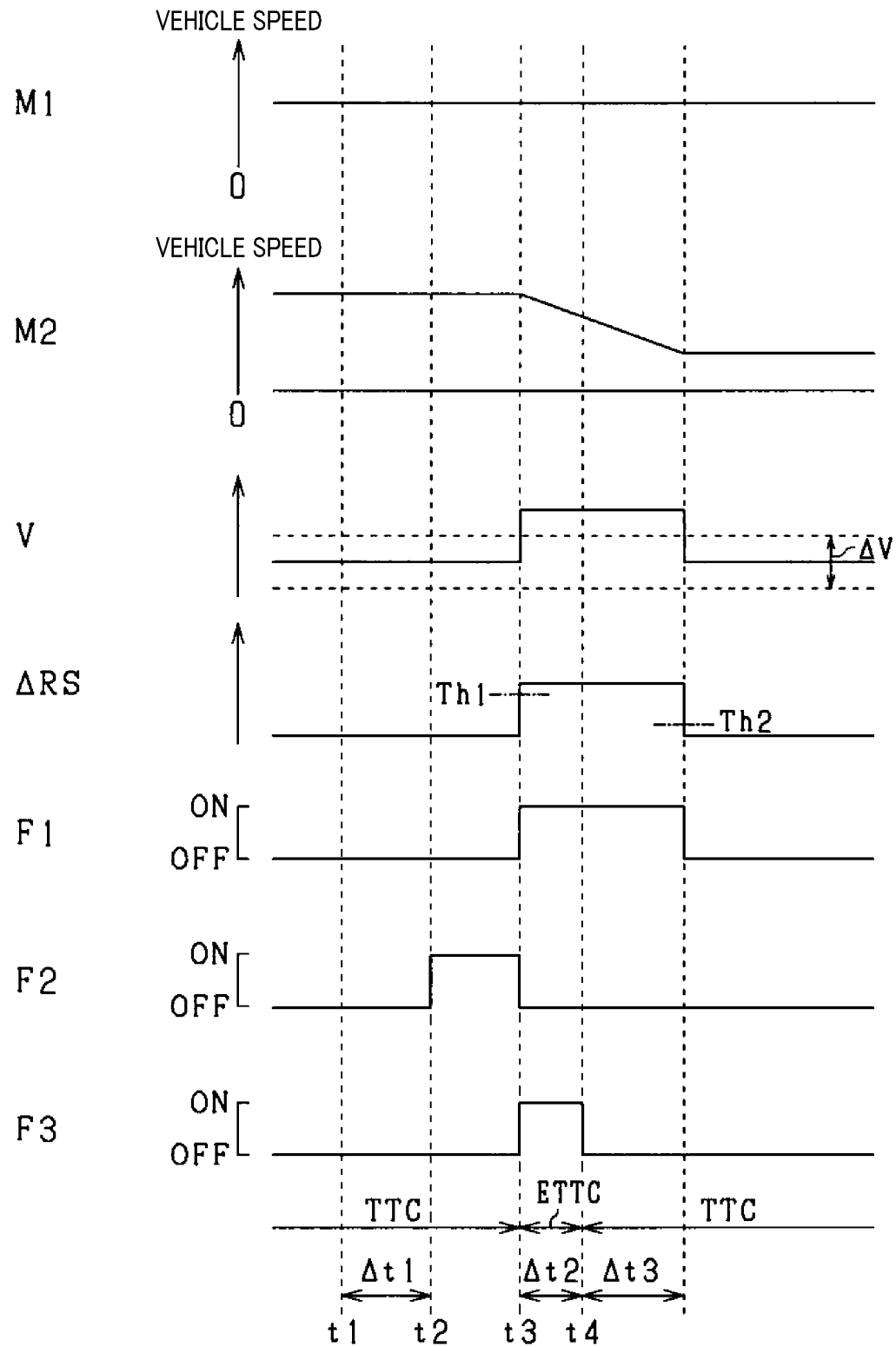
FIG. 10 is a drawing illustrating respective processes performed by a driving assistance device according to an exemplary embodiment.

Referring to FIG. 10, with respect to a time t1, a preceding car M2 does not decelerate and the relative velocity V between an own vehicle M1 and the preceding vehicle M2 is in the vicinity of zero (that is to say, below ΔV), such that the 11C is used as the predicted collision time. Thereafter, when the state where the relative velocity V is in the vicinity of zero becomes a time t2, which is a time after the determination period Δt1 elapses, the distracted driving state flag F2 is turned ON.

Afterwards, when the preceding vehicle puts on a brake at a time t3 such that the relative velocity V between the own vehicle M1 and the preceding vehicle M2 increases according to the deceleration of the preceding vehicle, the variation ΔRS of the relative velocity V becomes greater than the predetermined threshold Th1 and thus the deceleration determination flag F1 is turned ON. As a result, the preceding vehicle is determined to be in the deceleration state. Furthermore, in a case where the distracted driving state flag F2 is switched from ON to OFF at the time t3 and the elapsed time from the deceleration start is shorter than the time t2, the risk period flag F3 is switched to ON. Thereafter, while the risk period Δt2 does not elapse and the risk period flag F3 continues in the ON-state, the ETTC is used as the predicted collision time. Additionally, in the case of a time t4 at which the risk period Δt2 elapses, even though the deceleration determination flag F1 is turned ON and the preceding vehicle is in the deceleration state, the process returns to the state where the TTC is used as the predicted collision time. That is, in the case of a period Δt3, when the preceding vehicle is in the deceleration state, the TTC becomes used as the predicted collision time in FIG. 10.

As described hereinabove, following effects can be achieved.

When the preceding vehicle decelerates, the driving assistance can be performed at an earlier timing in consideration of the deceleration of the preceding vehicle by using the ETTC in consideration of the relative acceleration of the preceding vehicle as the predicted collision time. However, it is difficult to accurately acquire the distance information of the preceding vehicle (relative distance, relative velocity, relative acceleration) from the image acquired by the monocular imaging device 10. Particularly, since processes of time differentiating the relative velocity, and the like are required so as to achieve information on the relative acceleration α, there is a high possibility of including noise, errors, etc. in comparison with the relative distance D, the relative velocity V, etc. Consequently, when the driving assistance using the ETTC is performed as the predicted collision time, the driving assistance systems such as the alarm and the automatic braking, and the like may be unnecessarily operated at a timing when a driver does not want to perform the driving assistance, such that the driver may feel the sense of incongruity.

Even though the preceding vehicle decelerates, when the collision possibility between the own vehicle and the preceding vehicle does not exist, the driving assistance using the ETTC at an early timing is not required. Here, on the condition that the preceding vehicle is in the deceleration state and the collision possibility between the own vehicle and the preceding vehicle exists, the ETTC is used as the predicted collision time. In other words, even though the preceding vehicle is in the deceleration state, the ETTC is not used as the predicted collision time when the collision possibility between the own vehicle and the preceding vehicle does not exist. Consequently, in a state where the preceding vehicle decelerates, a chance of performing the driving assistance based upon the ETTC is configured to be limited, thereby having effects of suppressing the unnecessary operation of the driving assistance and of more appropriately performing the driving assistance of the own vehicle.

In a case where a driver is in the distracted driving state, when the preceding vehicle decelerates, the collision avoidance operation by the driver is delayed, such that the collision possibility increases. In this case, it is preferable that the collision avoidance is performed at an early timing by the ETTC. In contrast, in a case where the driver is not in the distracted driving state, when the preceding vehicle decelerates, there is a high possibility that the driver can avoid the collision therebetween. Accordingly, it is considered that the driving assistance using the ETTC at the early timing is not necessarily required. Therefore, even though the preceding vehicle is in the deceleration state, the ETTC is not used as the predicted collision time when the driver is not in the distracted driving state. As described hereinabove, it is advantageously possible to suppress the unnecessary operation of the driving assistance, thereby more appropriately performing the driving assistance of the vehicle.

When the relative velocity V between the own vehicle and the preceding vehicle is continuously low and a distance change between the own vehicle and the preceding vehicle does not occur continuously, driving may become monotonous such that there is a high possibility that the vehicle becomes in the distracted driving state. In this case, it is determined that the vehicle is in the distracted driving state on the condition that the relative velocity V between the own vehicle and the preceding vehicle which is acquired from the image as the distance information keeps continuing for a predetermined determination time in a state of being lower than a predetermined value. As described hereinabove, when the distance information (relative velocity V) acquired from the image is used, the distracted driving state may be easily determined without adding a new configuration.

In the case of the distracted driving state, the collision possibility between the own vehicle and the preceding vehicle increases immediately after the preceding vehicle starts to decelerate. Thus, when the distracted driving state is determined and the deceleration period starts immediately after the preceding vehicle starts to decelerate, the ETTC is configured to be used as the predicted collision time. In other words, if it is not determined that the vehicle is in the distracted driving state immediately after the preceding vehicle starts to decelerate, the ETTC is not used as the predicted collision time. Furthermore, even though the vehicle in the distracted driving state, the ETTC is not used as the predicted collision time in a case where it is not a state immediately after the preceding vehicle starts to decelerate. As described hereinabove, it is possible to suppress the unnecessary operation of the driving assistance, thereby more appropriately performing the driving assistance of the own vehicle.

The predicted collision time required until the own vehicle collides with the preceding vehicle is calculated as the virtual time, based upon the virtual deceleration VD, the relative distance D, and the relative velocity V on the assumption that the preceding vehicle decelerates at a predetermined virtual deceleration VD as well as the relative distance D of the preceding vehicle and the relative velocity V thereof. Then, the ETTC is used as the predicted collision time on the condition that the virtual time is lower than the lower limit value of the allowed time in which the collision avoidance operation by the driver is possible. In this case, when the virtual time is greater than the lower limit value of the allowed time and the collision avoidance operation by the driver is possible, the ETTC having low accuracy is not configured to be used as the predicted collision time. As described hereinabove, it is possible to suppress the unnecessary operation of the driving assistance, thereby more appropriately performing the driving assistance of the own vehicle.

When the image is not reliable, accuracy of the ETTC calculated by using the distance information acquired from the image deteriorates. Here, on the condition that the image is reliable, the image is used for calculating the distance information. As described hereinabove, the deterioration of calculation accuracy with respect to the ETTC due to the low accuracy of the image can be suppressed.

The reliability of the image can be evaluated easily in comparison with a matching degree of the image magnification rate K (K1, K2) obtained by a different method.

When the preceding vehicle is in the deceleration state and the collision possibility between the own vehicle and the preceding vehicle does not exist, a vehicle control at the early timing by virtue of the ETTC is not required such that the ETTC is not used as the predicted collision time. As described hereinabove, the chance of performing the driving assistance based upon the ETTC is configured to be limited, thereby having the effects of suppressing the unnecessary operation of the driving assistance and of more appropriately performing the driving assistance of the own vehicle.

Since the TTC does not use the relative acceleration, a possibility that the noise, the error, and the like are included therein is lower than ETTC. When the preceding vehicle is in the deceleration state and the collision possibility between the own vehicle and the preceding vehicle does not exist, it is advantageously possible to suppress the unnecessary operation of the driving assistance by using the TTC as the predicted collision time.

In the deceleration state of the own vehicle, the vehicle control is configured to be executed by using any one of the ETTC considering the relative acceleration α and the TTC not considering the relative acceleration α. In this case, in comparison with a case where only the ETTC is used for the predicted collision time in the deceleration state of the own vehicle, the chance of performing the driving assistance based on the ETTC in the deceleration state of the own vehicle is configured to be limited, and thus consequently, it is advantageously possible to suppress the unnecessary operation of the driving assistance.

The exemplary embodiments described hereinabove may be modified as described hereinafter. A same figure number will be used with respect to a configuration same as the configuration described hereinabove in following descriptions, and the detailed descriptions will be omitted.

As described hereinabove, the possibility determination section 26 may include at least any one of functions of the risk period determination unit 261, the virtual deceleration determination unit 262, and the reliability determination unit 263. That is, in the process in FIG. 6, at least one of respective processes at steps S16 to S18 may be executed, and the respective processes can be omitted. Furthermore, in FIG. 6, order of respective processes at steps S15 to S18 can be replaced.

As described hereinabove, the reliability determination unit 263 may be a unit determining that the image reliability exists on the condition that learning of an image FOE is completed. That is, in a state where the learning of a point at infinity (FOE: Focus of Expansion) of the monocular imaging device 10 is not completed, accuracy of the distance information acquired from the image may not be secured. Accordingly, it is determined that the image is reliable on the condition that the learning of the FOE is completed.

Figure 11:
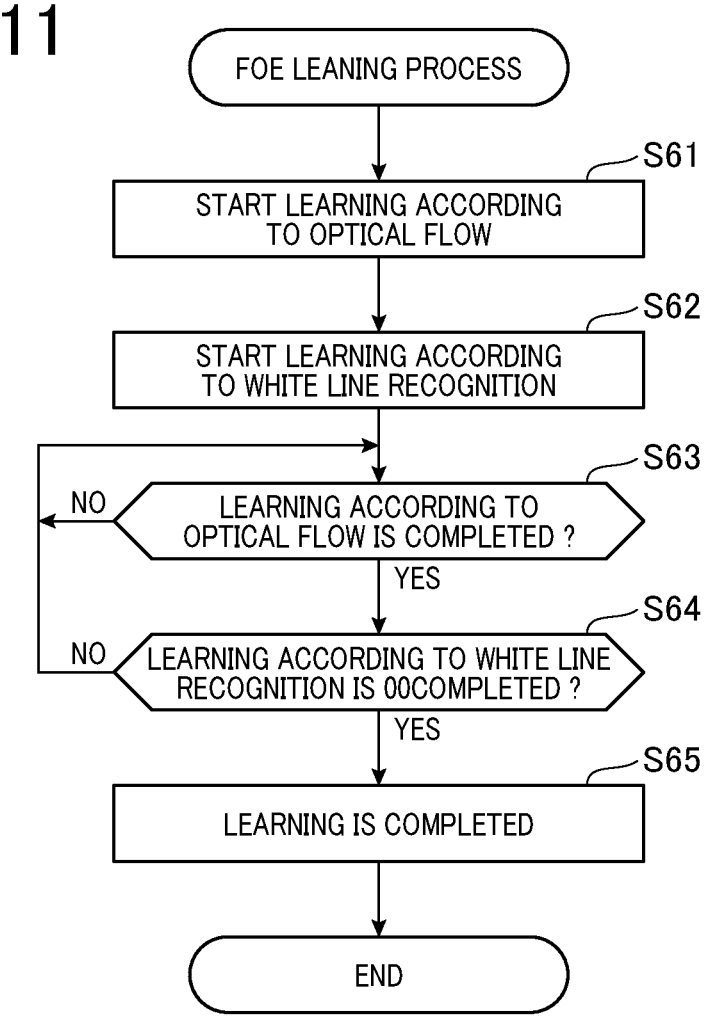
FIG. 11 is a drawing illustrating an optical flow.
Figure 12:
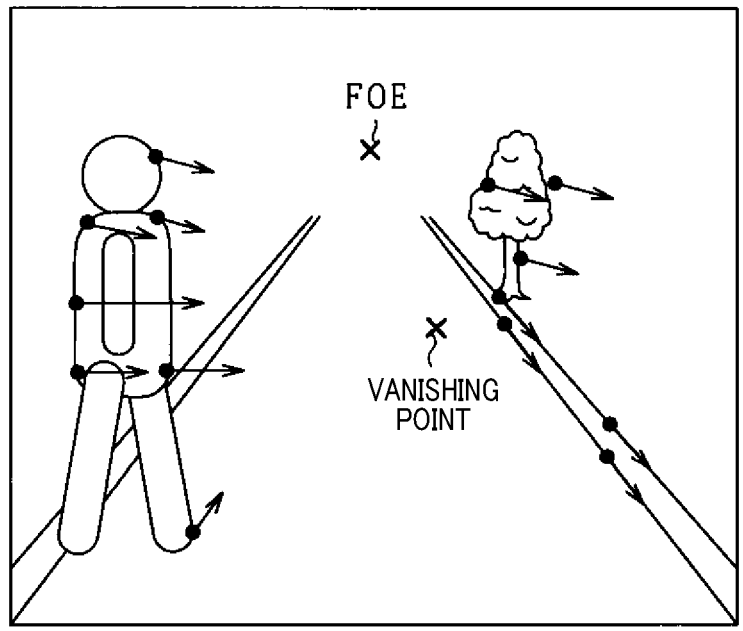
FIG. 12 is a flowchart illustrating a FOE learning process performed by a driving assistance device.

With reference to FIGS. 11 and 12 in detail, first, learning according to an optical flow starts at step S61 when the vehicle is traveling with respect to a flow chart of FIG. 11.

In this process, as shown in FIG. 12, for example, a plurality of feature points are set at edges of images, and a vector (optical flow) is obtained as to how the plurality of feature points move according to time series, based on which a position of the FOE is obtained by using the optical flow.

For example, with respect to the optical flow, it is detected that stationary objects such as a white line or a tree move so as to appear from the FOE. Furthermore, moving objects moving from left and right images such as a pedestrian running out into a road or a bicycle are detected so as to move with respect to a vanishing point different from the FOE. In other words, when an appearance point of the object is obtained, the position of the FOE can be acquired. Since a process of detecting the position of the FOE using the optical flow is completed by performing an image process with respect to images of several frames, it is advantageously possible to determine the position of the FOE in a relatively short time.

Next, learning with respect to the position of the FOE according to white line recognition starts at step S62. In this process, the position of the FOE is determined, for example, by recognizing white lines positioned on the left and right side of the vehicle from the image as shown in FIG. 12, and by obtaining an intersection point on extended lines of the white lines. In this way, in a process of obtaining the position of the FOE based upon the positions of the white lines, the position of the FOE can be accurately obtained. Meanwhile, since this process requires that the own vehicle is traveling on a straight road without undulation and the white line exists on the left and right side of the own vehicle. It may take time to determine the position of the FOE.

Next, it is determined whether or not the learning of the position of the FOE by the optical flow is terminated (completed) at step S63. When the learning of the position of the FOE by the optical flow is terminated at step S63 (YES), it is determined whether or not the learning of the position of the FOE according to the white line recognition is terminated at step S64. When the learning of the position of the FOE according to the white line recognition is terminated at step S64 (YES), the position of the FOE is recorded in a memory such as a RAM, and simultaneously a FOE learning process is terminated at step S65. Furthermore, the FOE learning process is executed repeatedly at regular time intervals or at an arbitrary timing, thereby accumulating the position of the FOE in the memory. When a negative determination is made at steps S63 and S64, the process returns to step S63. According to the process described hereinabove, the deterioration of the calculation accuracy with respect to the ETTC due to the low accuracy of the image can be suppressed.

In the process of FIG. 9 described hereinabove, a length of the risk period Δt2 may be variably set in response to an increasing degree of the relative velocity V after the distracted driving state is determined. For example, it is assumed that the lower the variation ΔRS of the relative velocity V is, the longer a period, during which the collision risk increases, is after the deceleration of the preceding vehicle starts, such that the risk period Δt2 is configured to be long. In this manner, it is advantageously possible to configure a period during which the driving assistance based on the ETTC is performed in response to a deceleration degree of the preceding vehicle in a manner of variably setting the risk period Δt2 in response to the deceleration degree of the preceding vehicle, thereby having the effect of suppressing an unnecessary operation of the driving assistance based upon the ETTC and increasing the effect thereof.

When the relative velocity V changes in the process of FIG. 9 at step S51 (YES), it is determined whether the own vehicle and the preceding vehicle are in a state of approaching each other or moving away from each other, based on which the risk period flag F3 may be selected to be turned ON or OFF. That is, when the relative velocity V changes in the distracted driving state of the own vehicle, and further when the own vehicle and the preceding vehicle are in the state of approaching each other, the risk period flag F3 is turned ON. When the own vehicle and the preceding vehicle are in the state of being separate from each other, the risk period flag F3 is turned OFF. Furthermore, the state of whether the own vehicle and the preceding vehicle are approaching each other or moving away from each other may be determined by obtaining a vector of the relative velocity V. As described hereinabove, the risk period may be determined on the condition that the own vehicle and the preceding vehicle are in the state of approaching each other in the distracted driving state of the own vehicle.

As described hereinabove, the risk period determination unit 261 determines whether or not the driver is in the distracted driving state based upon the relative velocity V between the own vehicle and the preceding vehicle. In addition, a camera may be installed in the passenger compartment of the own vehicle so as to capture a facial expression of the driver. Afterwards, an image process is performed on an image captured by the camera, and when it is detected that the driver has a facial expression in which the driver does not concentrate on driving, it may be determined that the driver is in the distracted driving state. For example, when it is detected that the driver has a facial expression in which the drive looks sideways or does not look to the front carefully, and the like, it may be determined that the driver is in the distracted driving state.

With respect to the description hereinabove, the risk period determination unit 261 may determine the risk period, based upon whether or not the driver is determined to be in the distracted driving state regardless of the elapsed time from the deceleration start. That is, in the determination process of the risk period at step S16 in FIG. 6, the process in FIG. 8 is performed and the process in FIG. 9 is omitted. In this case, at step S16 in FIG. 6, when it is determined that the distracted driving state flag F2 is turned ON at step S43 (YES) in the process in FIG. 8, the risk period is determined at step S16 (YES). On the other hand, when it is determined that the distracted driving state flag F2 is turned OFF at step S43 (NO), the risk period is not determined at step S16 (NO). Furthermore, it may be determined that the distracted driving state is canceled when the driver's vehicle operation is performed.

The driving assistance device 100 may include a radar device. For example, the radar device is a well-known millimeter wave radar in which a high-frequency signal in a millimeter wave band is used as a transmission wave, and is installed at a front end part of the own vehicle. Furthermore, a region existing within a predetermined detection angle is configured as a detection range where a target is detectable, based on which the radar device detects a position of the target existing within the detection range. More specifically, a probing wave is transmitted at a predetermined cycle, and a reflected wave is received by a plurality of antennas. The relative distance D of the target is calculated based upon a transmission time of the probing wave and a reception time of the reflected wave. Additionally, the relative velocity V is calculated based upon frequency which is changed by the Doppler effect of the reflected wave reflected by the target.

With respect to a configuration including the radar device and the imaging device 10, when the radar device is broken, the relative distance D, the relative velocity V, and the relative acceleration α are calculated from the image of the imaging device 10. In this case, it is advantageously possible to perform the driving assistance based upon the ETTC as the predicted collision time under an appropriate condition by performing the respective processes described in FIGS. 6 to 9.

Referring to FIG. 1, the distance information acquisition unit 23 acquires a differential value (change amount) of the image magnification ratio as information corresponding to the relative acceleration. The predicted collision time calculation unit 24 may calculate the ETTC in consideration of the differential value of the image magnification ratio. Referring to U.S. Patent Application Publication No. 886179, detailed descriptions of an ETTC calculation method using the differential value of the image magnification ratio are disclosed.

Referring to FIG. 1, the imaging device 10 may include the distance information acquisition unit 23 and the predicted collision time calculation unit 24. That is, the imaging device 10 may acquire distance information between the own vehicle and respective targets and may calculate the predicted collision time based upon the acquired distance information.

DESCRIPTION OF SYMBOLS

10 . . . imaging device
20 . . . ECU
24 . . . predicted collision time calculation unit
25 . . . deceleration state determination unit
261 . . . risk period determination unit
262 . . . virtual deceleration determination unit
263 . . . reliability determination unit

What is claimed is:

1. A driving assistance device, comprising:
a distance information acquisition unit acquiring a relative distance of a preceding vehicle in a travelling direction of an own vehicle, a relative velocity thereof, and acceleration information thereof including any one of a relative acceleration and information corresponding to the relative acceleration, the relative distance, the relative velocity and the acceleration information being obtained from an image acquired as distance information by a single monocular imaging device;
a predicted collision time calculation unit calculating a time required until the own vehicle collides with the preceding vehicle by considering the acceleration information as a predicted collision time;
a deceleration state determination unit determining whether or not the preceding vehicle is in a deceleration state by using the relative velocity;
a possibility determination unit determining whether or not a collision possibility between the own vehicle and the preceding vehicle exists; and
a use determination unit determining whether to use the predicted collision time to perform driving assistance based on the preceding vehicle being determined to be in the deceleration state and the collision possibility is determined to exist.

2. The driving assistance device according to claim 1, wherein the possibility determination unit determines the collision possibility in a distracted driving state where there is a possibility that a driver drives the own vehicle distractedly.

3. The driving assistance device according to claim 2, wherein the possibility determination unit determines the distracted driving state on the condition that an absolute value of the relative velocity between the own vehicle and the preceding vehicle keeps continuing for a predetermined determination time in a state of being lower than a predetermined value.

4. The driving assistance device according to claim 3, wherein the possibility determination unit determines the collision possibility on the condition that the distracted driving state is determined and a predetermined deceleration period starts immediately after the preceding vehicle starts to decelerate.

5. The driving assistance device according to claim 4, wherein the possibility determination unit calculates the time required until the own vehicle collides with the preceding vehicle as a virtual time based upon the virtual deceleration, the relative distance, and the relative velocity on the assumption that the preceding vehicle decelerates at a predetermined virtual deceleration; and determines the collision possibility on the condition that the virtual time is lower than a lower limit value of an allowed time in which a collision avoidance operation by a driver is possible.

6. The driving assistance device according to claim 5, wherein the possibility determination unit includes a reliability determination unit determining whether or not the image acquired is reliable; and the distance information acquisition unit acquires the distance information by using the image which is determined to be reliable.

7. The driving assistance device according to claim 2, wherein the possibility determination unit determines the collision possibility on the condition that the distracted driving state is determined and a predetermined deceleration period starts immediately after the preceding vehicle starts to decelerate.

8. The driving assistance device according to claim 7, wherein the possibility determination unit calculates the time required until the own vehicle collides with the preceding vehicle as a virtual time based upon the virtual deceleration, the relative distance, and the relative velocity on the assumption that the preceding vehicle decelerates at a predetermined virtual deceleration; and determines the collision possibility on the condition that the virtual time is lower than a lower limit value of an allowed time in which a collision avoidance operation by a driver is possible.

9. The driving assistance device according to claim 8, wherein the possibility determination unit includes a reliability determination unit determining whether or not the image acquired is reliable; and the distance information acquisition unit acquires the distance information by using the image which is determined to be reliable.

10. The driving assistance device according to claim 9, wherein the reliability determination unit acquires a size change ratio of an image region of the preceding vehicle with respect to the image as a first image magnification ratio according to a first method, and acquires a size change ratio of an image region of the preceding vehicle with respect to the image as a second image magnification ratio according to a second method different from a first method; and based on a difference between the first image magnification ratio and the second image magnification ratio being lower than a predetermined value, the image is determined to be reliable.

11. The driving assistance device according to claim 1, wherein the possibility determination unit calculates the time required until the own vehicle collides with the preceding vehicle as a virtual time based upon the virtual deceleration, the relative distance, and the relative velocity on the assumption that the preceding vehicle decelerates at a predetermined virtual deceleration; and determines the collision possibility on the condition that the virtual time is lower than a lower limit value of an allowed time in which a collision avoidance operation by a driver is possible.

12. The driving assistance device according to claim 11, wherein the possibility determination unit includes a reliability determination unit determining whether or not the image acquired is reliable; and the distance information acquisition unit acquires the distance information by using the image which is determined to be reliable.

13. The driving assistance device according to claim 12, wherein the reliability determination unit acquires a size change ratio of an image region of the preceding vehicle with respect to the image as a first image magnification ratio according to a first method, and acquires a size change ratio of an image region of the preceding vehicle with respect to the image as a second image magnification ratio according to a second method different from the first method; and based on a difference between the first image magnification ratio and the second image magnification ratio being lower than a predetermined value, the image is determined to be reliable.

14. The driving assistance device according to claim 12, wherein the reliability determination unit determines whether or not the image has the reliability based upon progress status of learning by which a position of a point at infinity in the image is determined; and based on the learning by which the position of the point at infinity being determined to be completed, the image is determined to be reliable.

15. The driving assistance device according to claim 11, wherein the reliability determination unit acquires a size change ratio of an image region of the preceding vehicle with respect to the image as a first image magnification ratio according to a first method, and acquires a size change ratio of an image region of the preceding vehicle with respect to the image as a second image magnification ratio according to a second method different from a first method; and based on a difference between the first image magnification ratio and the second image magnification ratio being lower than a predetermined value, the image is determined to be reliable.

16. The driving assistance device according to claim 1, wherein the use determination unit does not use the predicted collision time based on the preceding vehicle being in the deceleration state and the collision possibility between the own vehicle and the preceding vehicle not existing.

17. The driving assistance device according to claim 1, wherein the predicted collision calculation unit calculates the time required until the own vehicle collides with the preceding vehicle as a second predicted collision time based upon the relative distance and the relative velocity from among the distance information; and the use determination unit determines to use the second predicted collision time based on the preceding vehicle being in the deceleration state and the collision possibility not existing.

18. The driving assistance device according to claim 17, comprising a vehicle control unit that controls the own vehicle by using any one of the predicted collision time and the second predicted collision time based on the own vehicle being determined to be in the deceleration state.

19. A driving assistance method, comprising the steps of: acquiring a relative distance of a preceding vehicle in a travelling direction of an own vehicle, a relative velocity thereof, and acceleration information thereof including any one of a relative acceleration and information corresponding to the relative acceleration, the relative distance, the relative velocity and the acceleration information being obtained from an image acquired by a single monocular imaging device, as distance information;

calculating a time required until the own vehicle collides with the preceding vehicle by considering the acceleration information as a predicted collision time;

determining whether or not the preceding vehicle is in a deceleration state by using the relative velocity;

determining whether or not a collision possibility between the own vehicle and the preceding vehicle exists; and determining whether to use the predicted collision time to perform driving assistance based on that the preceding vehicle is determined to be in the deceleration state and the collision possibility is determined to exist.

* * * * *